United States Patent Office 3,219,703
Patented Nov. 23, 1965

3,219,703
MANUFACTURE OF DIARYLAMINES FROM NITROAROMATICS
Harry W. Kilbourne, St. Albans, James E. Van Verth, Huntington, and Gene R. Wilder, St. Albans, W. Va., assignors to Monsanto Company, a corporation of Delaware
No Drawing. Filed Feb. 2, 1961, Ser. No. 86,606
9 Claims. (Cl. 260—571)

This invention relates to the manufacture of diarylamines by aminodehydrogenation of alicyclic ketones. One embodiment of the invention relates to manufacture of diphenylamines from nitroaromatics and alicyclic ketone, which ketone serves as a source of a second aryl group. Fundamentally, the process involves heating nitroaromatic and a molar excess of cyclohexanone or other six-membered alicyclic ketone with dehydrogenation catalyst. The course of the reaction is obscure and evidently involves a complicated series of reactions. These are carried out simultaneously without isolating intermediate. The invention is not limited to any theory or opinion as to the mechanism by which the desired products form.

Aromatization requires alicyclic ketones containing six carbon atoms in the ring to which the keto group is attached but substituents may be present in this ring and condensed rings are suitable. Examples comprise cyclohexanone, 2 - methylcyclohexanone, 3 - methylcyclohexanone, 4 - methylcyclohexanone, 3,4 - dimethylcyclohexanone, 2,5-dimethylcyclohexanone, 4-ethylcyclohexanone, 4 - propylcyclohexanone, 4 - isopropylcyclohexanone, 4-butylcyclohexanone, 4-tert.-butylcyclohexanone, 2-ethylcyclohexanone, alpha-tetralone, beta-tetralone and 2-propylcyclohexanone. In addition to saturated ketones unsaturated ketones are also useful, as for example, carvenone, menthone and 3,5-dimethyl-2-cyclohexen-1-one. Ketones containing a quaternary carbon in the ring react poorly in the present process.

The process is especially applicable to nitroaromatic hydrocarbons but is not confined thereto. The aromatic nucleus containing one or more nitro groups may contain hydrocarbon substituents but readily reducible substituents are undesirable. Hydrocarbonoxy groups or fluoro substituents may be present. Depending upon the choice of reactants a variety of diarylamines can be made by the process of this invention. Suitable nitro-compounds comprise o-ethoxynitrobenzene, p-dinitrobenzene, m-dinitrobenzene, 1-nitronaphthalene, 2-, 3- and 4-nitrotoluene, 4-nitroanisole, 2,4-dinitrotoluene, 4-nitrodiphenyl, p-propoxynitrobenzene, p-ethoxynitrobenzene, p-isopropoxynitrobenzene, p-ethylnitrobenzene, p-propylnitrobenzene, p-isopropylnitrobenzene, m-ethylnitrobenzene, p-amylnitrobenzene, p-hexylnitrobenzene, p-octylnitrobenzene, p-decylnitrobenzene, p-dodecylnitrobenzene, m-butylnitrobenzene, m-tert.-butylnitrobenzene, p-tert.-butylnitrobenzene, p - sec.-octylnitrobenzene, p - tert.-dodecylnitrobenzene, p-tert.-octylnitrobenzene, p-phenoxynitrobenzene, p-cyclohexylnitrobenzene, p-fluoronitrobenzene and p-benzylnitrobenzene. Probably because of steric factors 2,6-dialkylnitrobenzenes react slowly but still give good results.

It will be appreciated that presence of radicals more reactive with the ketone than the nitro radical is disadvantageous and results in excessive side reaction. Thus, primary amino groups should be absent but secondary amino groups react more slowly under the relatively mild conditions at which aromatization takes place and may be present. For example, p-nitrodiphenylamine, N-benzyl-p-nitroaniline and N-alkyl-p-nitroanilines react to yield compounds in which alicyclic ketone is converted to aromatic amino radical in place of the nitro radical exclusively. Tertiary amine by-products formed, if any, may be separated or left in as desired. Mixtures are frequently useful as antioxidants for oxidizable substances such as natural and synthetic rubber and gasoline. Examples of N-alkylnitroanilines suitable as reactants comprise those in which the alkyl group is methyl, ethyl, propyl, isopropyl, butyl, tert.-butyl, sec.-butyl, isobutyl, amyl, pentyl, hexyl, octyl, tert.-octyl, sec.-octyl, nonyl, decyl, undecyl, dodecyl, hexadecyl and the like. In general, as the alkyl group increases in size amount of by-products is reduced.

Many dehydrogenation catalysts are known and a variety are commercially available. In general, hydrogenation catalysts also function as dehydrogenation catalysts. Examples of dehydrogenation catalysts are rhodium, ruthenium, platinum, palladium, Raney nickel, Raney cobalt, copper chromite, iridium, osmium, oxides of chromium and oxides of molybdenum. For the purposes of the present invention palladium is much to be preferred, is effective under milder conditions and results in higher yields. It will be appreciated, however, that other dehydrogenation catalysts are contemplated and the desired products have been prepared from reactions with other catalyst systems. Desirably, the catalyst is supported on charcoal, asbestos, alumina, pumice, kieselguhr, silica gel or barium sulfate. Amounts as low as 1% of 5% palladium on carbon give satisfactory results. The amount of catalyst, expressed as percent by weight of the final product expected from the reaction assuming theoretical yield, will depend upon the reaction rate required. Amounts within the range of 1%–12% catalyst (5% palladium on carbon) efficiently catalyze the reactions although these are not the absolute limits. The reactions may be effected in the presence of elemental hydrogen providing the hydrogen concentration is not so high as to make hydrogenation predominate over dehydrogenation. The presence of hydrogen gas sometimes mitigates catalyst poisoning.

The optimum temperature for heating usually will fall with the range of 150–250° C. depending upon the particular ketone reacted. These are not the absolute operating limits. The reactions go at lower temperature and may be conducted at higher temperature below decomposition temperature causing rupture of carbon-carbon bonds. In general, the reaction temperature will not be above 300° C. It is feasible to separate by-product water during the reaction. This may be accomplished by azeotropic distillation employing any of the well-known azeotroping agents, but preferably excess of cyclic ketone, used as a reactant. Conversely, the reactions may be run in a closed system without azeotroping water. It appears that the driving force for the reaction is not elimination of water but reduction of the nitro-compound.

The following examples illustrate the invention in further detail.

A mixture was prepared of 12.3 grams (0.1 mole) of nitrobenzene, 2 grams of 5% palladium on carbon and 65 ml. of cyclohexanone. The mixture was heated while distilling off water. The first water was collected when the temperature reached 161° C. Heating was continued for about 5 hours at 161–172° C. while collecting 5.6 ml. of water. Heating was then discontinued and the reaction mixture cooled, filtered and the solids washed with cyclohexanone. The filtrate and washings were combined and an aliquot analyzed by gas liquid partition chromatographic analysis. It was thereby determined that the yield of diphenylamine was 95% of theoretical. There were traces of aniline and N-cyclohexylaniline present but no anil was detected.

A reactor was charged with 16.7 grams (0.1 mole) of p-nitrophenetole, 65 ml. of cyclohexanone and 2.0 grams of 5% palladium on carbon catalyst. The mixture was heated while distilling off water. Water began to separate at about 161° C. Heating was continued at 161–173° C. for about 2¼ hours while collecting 6.1 grams of water. The reaction mixture was then cooled, filtered and the filter rinsed with cyclohexanone. The filtrate and washings were distilled in vacuo to a pot temperature of 110–115° C. at 11 mm. Hg. The residue was cooled to about 50° C. and 50 ml. of petroleum ether added and the mixture cooled further in an ice bath and seeded. The crystalline material which separated was filtered, washed with petroleum ether and dried to obtain 11.8 grams of p-ethoxydiphenylamine, M.P. 71–71.6° C. This represents a yield of 56%.

A reactor was charged with 79.5 grams (0.44 mole) of N-isopropyl-p-nitroaniline, 129 grams (1.32 moles) of cyclohexanone and 5 grams of 5% palladium catalyst supported on charcoal. The reaction mixture was heated for 2½ hours at 158–168° C. during which period the theoretical quantity of water was collected. The catalyst was separated and the product subjected to gas liquid partition chromatographic analysis from which it was established that N-isopropyl-N'-phenyl-p-phenylenediamine had formed in 42.5% yield.

Phenol has been identified as a by-product of reactions involving cyclohexanone. A plausible theoretical general reaction is that two moles of nitrocompound combine with three moles of ketone to produce two moles of product, one mole of phenol and six moles of water. In this connection, it is desirable to use at least one and one-half moles of ketone per mole equivalent of nitrocompound. Thus, at least 1.5 molecular proportions of ketone should be charged for each nitro radical undergoing reaction.

It is intended to cover all changes and modifications of the examples of the invention herein chosen for purposes of disclosure which do not constitute departures from the spirit and scope of the invention.

What is claimed is:

1. The process of aromatization which consists essentially of heating at not above about 300° C. below temperature causing rupture of carbon-carbon bonds 1 molar proportion of nitrocompound selected from the group consisting of hydrocarbon nitrocompound, and substituted derivatives thereof wherein the substituents are less reactive with the ketone than a nitro radical and are selected from the group consisting of RO—, RNH— and fluorine where R is a hydrocarbon radical and at least 1.5 molar proportions of six-membered alicyclic hydrocarbon monoketone free from quaternary carbon in the ring with palladium catalyst thereby converting the alicyclic ketone to aromatic amino radical in place of nitro radical.

2. The process of aromatization which consists essentially of heating at not above about 300° C. below temperature causing rupture of carbon-carbon bonds 1 molar proportion of nitroaromatic hydrocarbon and at least 1.5 molar proportions of six-membered alicyclic hydrocarbon monoketone free from quaternary carbon in the ring with palladium catalyst thereby converting alicyclic ketone to aromatic amino radical in place of nitro radical.

3. The process of making diarylamine which consists essentially of heating at not above about 300° C. below temperature causing rupture of carbon-carbon bonds 1 molar proportion of nitrobenzene and at least 1.5 molar proportions of six-membered alicyclic hydrocarbon monoketone free from quaternary carbon in the ring with palladium catalyst and isolating diarylamine.

4. The process of making diphenylamine which consists essentially of heating at not above about 300° C. below temperature causing rupture of carbon-carbon bonds 1 molar proportion of nitrobenzene and at least 1.5 molar proportions of cyclohexanone with palladium catalyst thereby forming diphenylamine.

5. The process of making diphenylamine which consists essentially of heating at not above about 300° C. below temperature causing rupture of carbon-carbon bonds 1 molar proportion of nitrobenzene and at least 1.5 molar proportions of cyclohexanone with palladium catalyst while removing by-product water from the reaction zone thereby forming diphenylamine.

6. The process of aromatization which consists essentially of heating at not above about 300° C. below temperature causing rupture of carbon-carbon bonds 1 molar proportion of p-nitrodiphenylamine and at least 1.5 molar proportions of six-membered alicyclic hydrocarbon monoketone free from quaternary carbon in the ring with palladium catalyst, thereby converting alicyclic ketone to aromatic radical in place of nitro radical.

7. The process of making diarylamines which consists essentially of heating at not above about 300° C. below temperature causing rupture of carbon-carbon bonds 1 molar proportion of monoalkylnitrobenzene and at least 1.5 molar proportions of cyclohexanone with palladium catalyst and isolating alkyldiphenylamine.

8. The process of making diarylamines which consists essentially of heating at not above about 300° C. below temperature causing rupture of carbon-carbon bonds 1 molar proportion of monoalkoxynitrobenzene and at least 1.5 molar proportions of cyclohexanone with palladium catalyst and isolating alkoxydiphenylamine.

9. The process which consists essentially of heating below 250° C. 1 molar proportion of N-alkyl-p-nitroaniline and at least 1.5 molar proportions of cyclohexanone with palladium catalyst thereby forming N-alkyl-N'-phenyl-p-phenylenediamine.

References Cited by the Examiner

UNITED STATES PATENTS

| | | | |
|---|---|---|---|
| 2,380,420 | 7/1945 | Emerson | 260—577 |
| 2,413,598 | 12/1946 | Ballard et al. | 260—578 |

CHARLES B. PARKER, *Primary Examiner.*